UNITED STATES PATENT OFFICE.

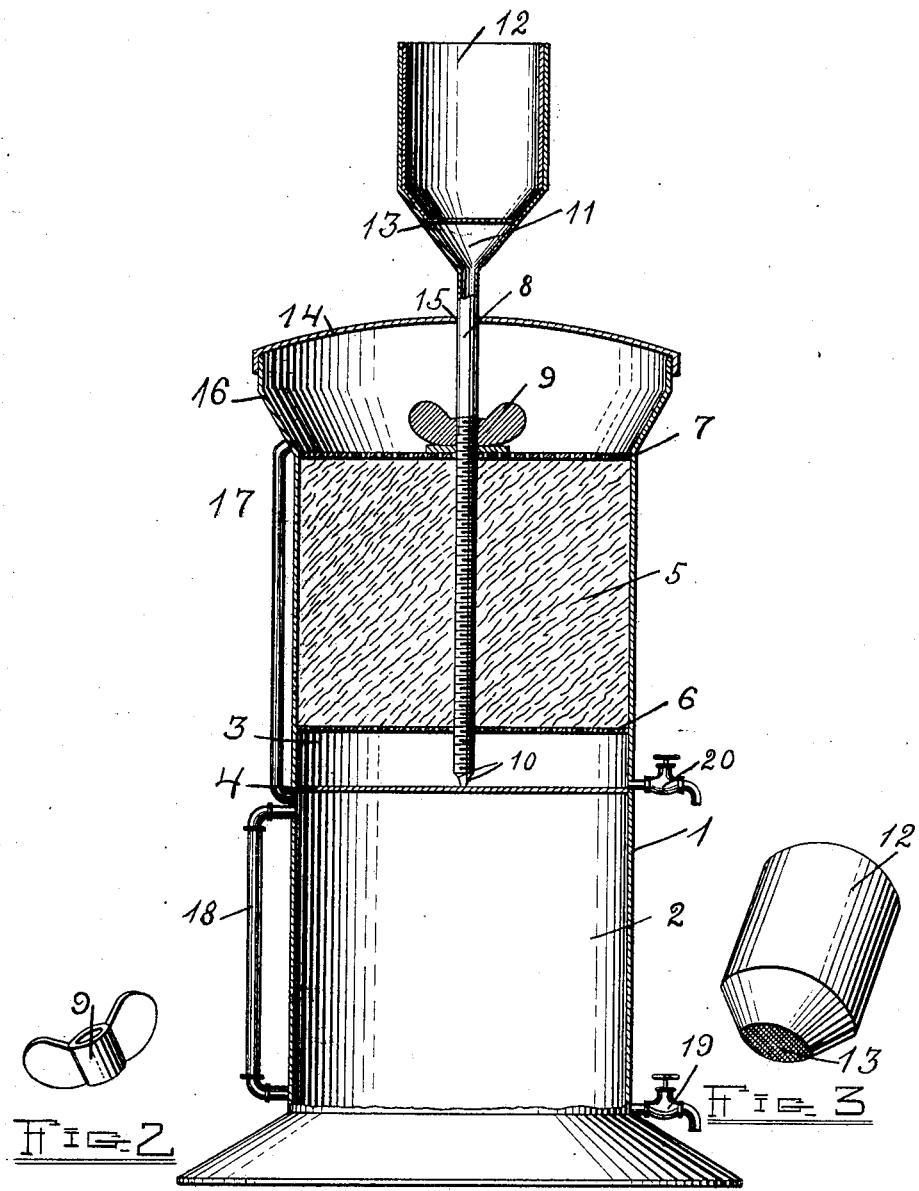

JOSEPH POLZIN, OF DAVENPORT, IOWA.

FILTER.

No. 885,516.   Specification of Letters Patent.   Patented April 21, 1908.

Application filed February 11, 1907. Serial No. 356,859.

*To all whom it may concern:*

Be it known that I, JOSEPH POLZIN, a citizen of the United States, residing at Davenport, in the county of Scott and State of Iowa, have invented certain new and useful Improvements in Filters; and I do declare the following to be a full, clear, and exact description of the invention, such as will enable others skilled in the art to which it appertains to make and use the same.

My invention has relation to improvements in filters, and it consists in the construction and arrangement of parts, as will be hereinafter described and particularly pointed out in the claim.

In the accompanying drawings which illustrate the invention,—Figure 1 is a vertical longitudinal sectional view of a filter embodying my invention; and Figs. 2 and 3 are similar views enlarged, of the lock-nut and inner cone, respectively.

Referring more particularly to the drawings, which are for illustrative purposes only and are therefore not drawn to scale, 1 indicates the body of my filter which is divided into upper and lower chambers 2 and 3 by means of a partition 4 preferably arranged substantially midway the height of the filter.

The upper chamber is provided with suitable filtering material 5, which is retained in position by means of two perforated plates 6 and 7, having central openings therein, the plate 6 being arranged at a suitable distance above the imperforate plate 4 to permit of the passage of the liquor to be filtered from the inlet 8 to all parts of the plate 6 and filtering material 5, and the upper plate 7 is adjustably-held on top of the filtering material by a lock-nut 9 that is adapted to be moved up and down upon the inlet pipe 8.

The lower end of the inlet pipe is cone-shaped and is provided with suitable openings 10, through which the liquor escapes and at its upper end it is provided with a funnel 11. Removably-seated within the funnel 11 is a removable cone 12, which is provided with a perforated plate 13 that is adapted to catch and retain the coarser material that is within the material to be filtered. A suitable cover 14 is provided for the upper end of the filter, through which access is gained to the interior of the filter and which is centrally provided with an opening, as shown at 15, for the passage of the inlet pipe 8.

Extending from the upper end of the filter, which is preferably enlarged or made flaring, as shown at 16, is a pipe or tube 17, which communicates with the lower chamber 2 at a short distance below the diaphragm 4. This tube preferably extends down upon the outside of the filter. A gage 18, preferably formed from a glass tube in the ordinary manner, is secured upon the outside of the lower chamber for the purpose of indicating the height of the filtered material within said chamber. A faucet 19 is provided at the bottom of the chamber 2 for drawing off its contents and a similar faucet 20 is preferably provided directly above the partition 4 for drawing off the sediment or other heavier matter deposited at that point.

In using my filter as above described, after the lower perforated plate 6 has been placed in position the chamber 3 is then filled with suitable material for filtering the particular liquid for which it is intended that the filter shall be used. When used for water such substances are used as experience has determined is most efficient for the particular impurities with which the water is charged, but for wine, liquor, vinegar, gasolene and certain kinds of water, the chamber 3 is filled with sand, but for machine and engine oils it is preferably filled with batting or wool. The perforated plate or follower 7 is then screwed down with the lower end of the inlet pipe resting upon or adjacent to the partition 4. The cone 12 is then placed within the funnel 11 and the material to be filtered is poured into the upper end of the cone 12 from whence it passes down through the perforated plate 13, inlet pipe 8 and out into the space between the partition 4 and plate 6. The heavier portions of the sediment are deposited within this space from which they may be withdrawn through the faucet 20 while the remaining portion of the material passes up through the body of filtering material into the space at the top of the filter above the plate 7. From there it passes down through the tube 17, as indicated by arrows, into the lower chamber or receiver 2, from whence it is withdrawn as desired through the faucet 19, the amount of material within the chamber always being indicated by the sight tube 18.

It is evident that changes and modifications may be made in the form and construction of the different parts of the invention and I reserve the right to make all such changes and modifications as will come within the scope of my invention.

Having thus described my invention, what I claim as new and desire to secure by Letters-Patent, is:—

A filter comprising a receptacle with a flaring upper end, a solid partition arranged approximately midway of the receptacle to provide a lower chamber, a pipe extending from the upper end of the receptacle and having communication with the lower chamber, a perforated plate having a central opening therein arranged above the partition to provide a sediment chamber therebetween, a perforated plate having a central opening therein arranged near the top of the receptacle to permit of filtering material being arranged between it and the first mentioned perforated plate, a cover for the receptacle having a central opening therein, a funnel having a screw threaded inlet pipe, said pipe being inserted through the opening of the cover and through the openings of the perforated plates and having a perforated cone-shaped lower end which serves to contact with the partition, a thumb nut mounted on the threads of the pipe which serves to hold the perforated plate in an adjustable position within the receptacle, a faucet for the sediment chamber, and a faucet for the lower chamber, substantially as specified.

In testimony whereof I have hereunto set my hand in presence of two subscribing witnesses.

JOSEPH POLZIN.

Witnesses:
FRANK BARRACLOUGH,
GEORGE J. PERRY.